Aug. 20, 1968  R. C. KERSH  3,397,541
CONTROL VALVE
Filed July 28, 1965  2 Sheets-Sheet 2
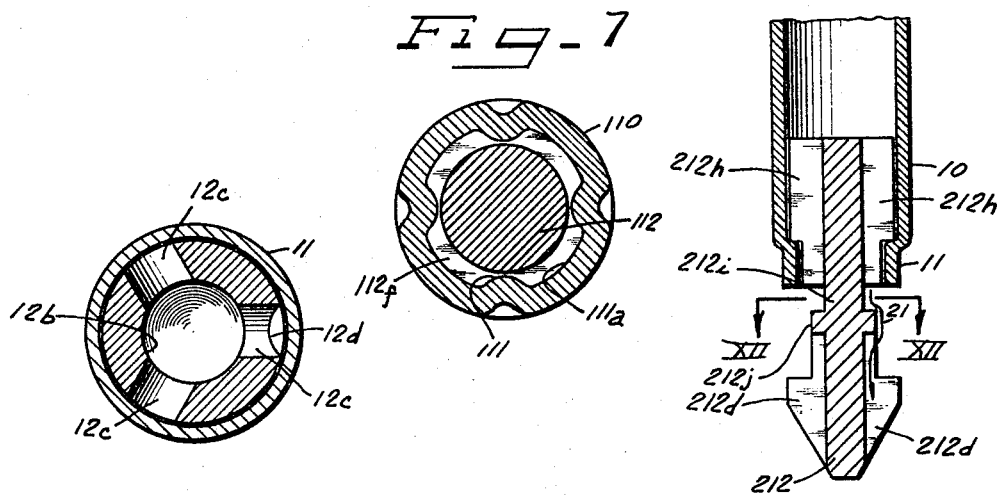
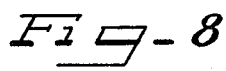
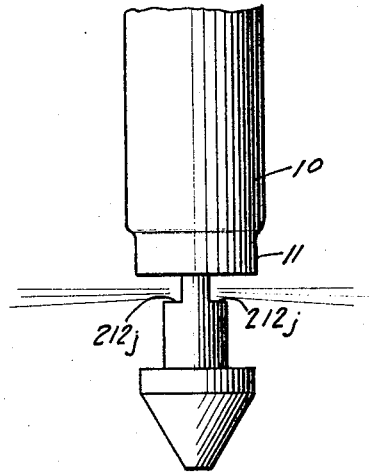
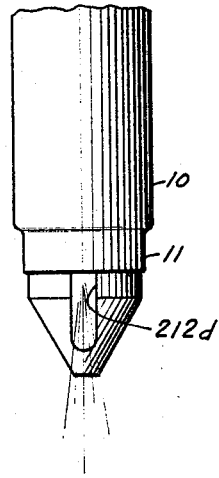
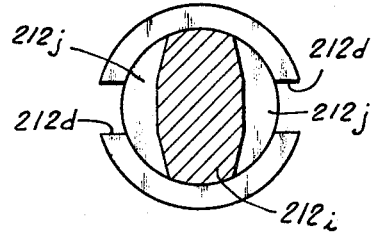
INVENTOR.
RONALD C. KERSH
BY  ATTORNEYS United States Patent Office 3,397,541
Patented Aug. 20, 1968

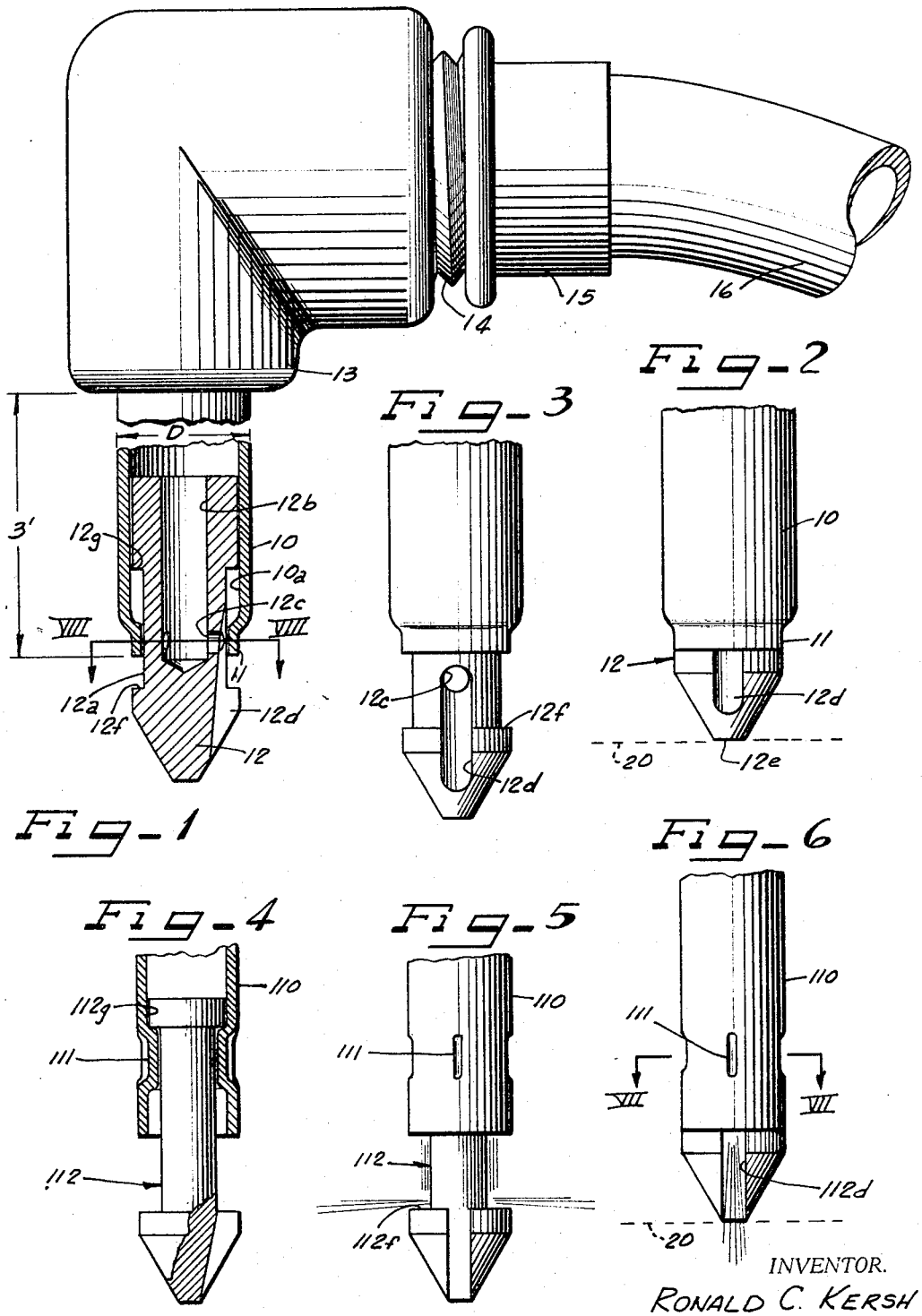

3,397,541
CONTROL VALVE
Ronald C. Kersh, Orinda, Calif., assignor to Proen Products Co., Berkeley, Calif., a corporation of California
Filed July 28, 1965, Ser. No. 475,376
7 Claims. (Cl. 61—13)

ABSTRACT OF THE DISCLOSURE

A sub-surface irrigating device comprising an imperforate tube having a slidable, pointed valve core at its lower extremity, the valve core providing axial fluid flow when slid into a telescoped position within the tube and a radial flow when slid into an extended position relative to the tube.

---

The present invention relates to sub-surface irrigating devices and is, more particularly, concerned with the provision of a novel and substantially improved mechanism for easily directing water at conventional city water pressure to areas substantially below the surface of the ground. As those concerned with the irrigation and fertilization of trees and other plants having root systems extending substantially below the surface of the ground are aware, it is oftentimes necessary or desirable to supply fertilizing materials and/or water to such root systems. The application of water or other liquids to subsurface strata is difficult, however, where the ground is hard. In some instances it has been found necessary when utilizing prior art devices to employ heavy equipment of a relatively specialized and extensive nature to pierce the ground to an appreciable depth.

In accordance with the present invention, an irrigating apparatus is employed capable of piercing the ground to a depth of several feet, where necessary, without requiring heavy duty construcion, vibrating or impacting equipment. In accordance with the present invention, water at standard water main pressures is employed in a novel manner as the piercing medium. A tubular rod is provided with a pointed valve mechanism at one extremity and with a standard hose connection at its other extremity. The valve is provided with flow-directing means that causes water from the hose, passing through the tube to the valve, to be directed axially of the tube around the pointed end of the valve directly against the ground immediately adjacent the point. The valve is positioned for directing the water flow axially in this manner by the application of an axial force in the direction of the valve. Such axial force may readily be accomplished by holding the tube in a generally vertical position with the valve point aaginst the ground. Under such circumstances of positioning, the water flows axially directly against the ground adjacent the point of the valve and erodes the ground in a manner permitting ready insertion, in a continuous manner, of the tube downwardly into the ground. As soon as the tube has been inserted into the ground to a depth considered satisfactory for irrigating purposes, axial downward pressure on the tube may be removed, permitting the tube to move upwardly relative to the valve point, at which time the configuration of the valve causes the water to flow radially outwardly in a direction generally normal to the axis of the tube, thereby providing transverse irrigation of the ground below the surface. Due to the ground-piercing action of the axially directed small diameter jet of water under pressure, insertion of the tubular device into the ground has been found to be exceptionally easy and, accordingly, the tube may be constructed of relatively lightweight material. Further, the valve construction employed for providing the jet action for ground drilling purposes, and for providing a radial fan of water during irrigating conditions, may readily be constructed in one piece, thereby providing an extremely simple apparatus having a single moving part and capable of extremely inexpensive manufacture. In view of the extreme simplicity of the device, and its essentially automatic operation in use, it is essentially foolproof and capable of satisfactory manipulation by persons without technical training.

It is, accordingly, an object of the present invention to provide a sub-surface irrigation mechanism of substantially simplified construction.

Another object of the present invention is to provide a substantially automatic irrigating mechanism having an integrated hydraulic drill and fan-type irrigation spray.

Still another object of the present invention is to provide a generally automatic combined drill and irrigation mechanism.

A feature of the invention is the provision of a one-piece valve combining drilling and irrigating functions.

Still a further feature of the invention is the provision of a jet-action hydraulic drill arranged for facilitating the insertion of an irrigating probe into the earth.

Yet another object of the invention is to provide a combination irrigation and fertilizing apparatus of extreme simplicity.

Still other and further objects and features of the present invention will at once become apparent to those skilled in the art from a consideration of the attached drawings, wherein three embodiments of the invention are shown by way of illustration only, and wherein:

FIGURE 1 is a side-elevational view of the irrigation device of the present invention partially broken away and foreshortened;

FIGURE 2 is a side-elevational view of the valve and of the irrigating device of the present invention in its drilling condition;

FIGURE 3 is a side-elevational view of the valve apparatus as shown in FIGURE 2 with the parts shown in the irrigating condition;

FIGURE 4 is a cross-sectional, side-elevational view of a modified form of the valve configuration with the parts shown in the irrigating condition;

FIGURE 5 is a side-elevational view of the structure shown in FIGURE 4;

FIGURE 6 is a side-elevational view of the valve construction shown in FIGURE 5 with the parts in the drilling, rather than the irrigating condition;

FIGURE 7 is a cross-sectional view of the valve apparatus taken along the line VII—VII of FIGURE 6;

FIGURE 8 is a cross-sectional view of the valve taken along the line VIII—VIII of FIGURE 1;

FIGURE 9 is a side-elevational view in cross-section of a third modified form of the present invention;

FIGURE 10 is a side-elevational view of the structure illustrated in FIGURE 9;

FIGURE 11 is a side-elevational view of the valve construction shown in FIGURE 10 with the parts in the drilling, rather than irrigating condition; and FIGURE 12 is a cross-sectional view taken along the line XIII—XIII of FIGURE 9.

As shown on the drawings:

As may be seen from a consideration of FIGURE 1, the present device comprises a longitudinally extending hollow tube 10 having a constriction 11 at the lower end thereof accommodating a reciprocably movable valve core 12. The upper end of the tube 10 is secured to a fitting 13 co-operating with threads 14 of a conventional male coupling 15 of a garden hose 16 or other source of hydraulic fluid under pressure. Although not illustrated, it is understood that conventional cartridge units may be coupled between the connections 13 and 14 to entrain fertilizer ingredients in the hydraulic fluid as it passes through the device. The tube 10 may be of any suitable length but commercial acceptance has been found for an irrigating tool having a tube 10 on the order of three feet in length and a cross-sectional diameter D of one-half inch.

In the embodiment illustrated in FIGURES 1 through 3, the constriction 11 of the tube 10 is a uniformly inwardly deflected annular portion surrounding an annular groove 12a around the valve core 12. The core 12 is provided with an axially extending bore 12b and having radially directed ports 12c at least one of which leads to an axially directed slot 12d. The core 12 is reciprocally movable in the vertical direction as illustrated in FIGURE 1 between extreme positions generally indicated in FIGURES 2 and 3.

In the position of the parts in FIGURE 2, the pointed end 12e of the valve core 12 rests against the ground, generally indicated by the dotted line 20 and the weight of the tube 10 and connection portion 13 causes the valve core to be in its withdrawn position as illustrated in FIGURE 2. As there shown, the constriction 11 rests upon the upwardly facing surface 12f of the valve core 12. Under these circumstances, the ports 12c are vented into the area 10a upstream of the constriction 11 and hydraulic fluid under pressure passes along slot 12d. The passage of fluid along slot 12d is the only path of fluid flow and, accordingly, fluid is directed axially downwardly against the earth 20 in a small diameter jet stream. This jet stream acts against the earth to erode the earth, permitting movement of the valve core 12 and the tube 10 gently downwardly into the soil. This movement may readily be accomplished manually without special tools. In this connection it will be observed that although the valve core 12 is provided with a somewhat flattened point 12e in the embodiments illustrated, the core 12 may be sharpened to a very sharp point, if desired.

When the tube 10 has been sunk into the earth to the extent desired, it may be lifted slightly, exposing the core 12 to the extent generally indicated in FIGURE 3. With the parts in this condition, fluid flows radially outwardly transverse to the axis of the tube 10 by way of the ports 12c, and no longer has any substantial axial component of velocity. Under these circumstances, the flow of the water, with or without fertilizing components, is generally horizontal to the earth's surface and relatively widespread sub-surface irrigation results. Movement of the core 12 downwardly relative to the tube 10 to an extent sufficient to permit complete removal of the core 12 is prevented by the shoulder 12g.

It will, accordingly, be seen that the irrigation device as shown in FIGURES 1 through 3, comprises a single moving part axially movable relative to the extended tube 3 to alternatively direct water, or other hydraulic fluid under pressure, axially of the tube 10 in a jet stream for drilling purposes or, radially for irrigating purposes. In its normal operation, downward pushing of the tube 10 by way of the element 13, causes the core 12 to remain in its jet action drilling condition and, substantially automatically upon removal of the weight of manual effort from the tube 10, slight lifting of the tube 10 will provide a transverse irrigating operation. It will be observed that the hydraulic pressure acting against the upper end of the core 12, and its reaction acting upwardly against the element 13 will normally cause separation of the valve parts into the extended position shown in FIGURE 3, thereby substantially automatically causing the device to assume the irrigating condition after removal of the manual force urging the tube 10 downwardly.

It will be appreciated that variations in the configuration of the tube 10 and the valve core 12 may be made to simplify manufacture or to provide slightly different irrigation flow patterns. In the embodiments shown in FIGURES 4, 5, 6 and 7, the valve 112 is solid, without an axial bore. Hydraulic flow passes, instead, around the outside diameter of the valve core flange 112g and past peripherally spaced indentations 111 via passageways 111a, as shown at FIGURE 7. During the drilling operation, the parts assume the condition shown in FIGURE 6 in which the water is directed axially downwardly by way of slot 112d in the same general manner as illustrated in FIGURE 2. However, upon completion of the drilling operation when the tube 10 is moved upwardly relative to the core 112, the hydraulic fluid moves axially against the flange 112f and is deflected radially outwardly in the pattern illustrated in FIGURE 5. Accordingly, transverse motion of the fluid is achieved in the embodiment of FIGURES 4 through 6 in much the same manner as in the embodiment of FIGURES 1 through 3.

A still further and commercially very acceptable form of the invention is shown in FIGURES 9, 10, 11 and 12. There, employing a similar numbering system, the tube is designated with the numeral 10 and is provided with a constriction 11 substantially the same as illustrated in FIGURE 1. The valve core 212 is, however, constructed preferably by forging, in a slightly different manner. As illustrated in FIGURE 9, the core 212 is provided with a pair of axial grooves 212d and with longitudinally extending grooves 212h, permitting axial flow of water downwardly along the central core or web 212i. During initial drilling operations, the parts assume the position shown in FIGURE 11 which the irrigating fluid under pressure is directed vertically downwardly around the stepped projection 212j in the manner indicated by arrow 21 in FIGURE 9. When the drilling operation is completed and the tube 10 is moved upwardly and the parts assume the position shown in FIGURE 10, the irrigation liquid is directed transversely by the stepped shoulder 212j.

It will, of course, be apparent to those skilled in the art that still further variations and modifications may be made without departing from the scope of the present invention. As a still further example, although not illustrated, a central bore could be extended upwardly from the lowermost point of the valve core to a radial bore positioned approximately in the position of the bore 12c in FIGURE 3, rather than providing the peripheral slot 12d there illustrated. The bore 12b would be closed at the upper end and the flange 12g peripherally notched to permit axial flow of hydraulic fluid. Under such an arrangement, of course, with the parts in the retracted condition, fluid would flow radially inwardly by way of the radial bore and axially through the central downwardly facing bore. Upon movement of the parts into the separated condition, flow would extend axially downwardly past the radial bore, now positioned outside of the tube 10, and against the shoulder 12f in the manner as already fully described. Since such variations may readily come to mind upon review of the present specification, it is my intention that the scope of the present invention be limited solely by that of the hereinafter appended claims.

I claim as my invention:

1. An irrigating tool comprising a tube, inlet means at the upper end of said tube for supplying fluid under pressure thereto, valve means at the lower end of said tube, said valve comprising a core reciprocal in the tube and having a pointed end projecting beyond the lower end of the tube, means retaining the core against removal from said tube and providing an extended position and a retracted position, said retaining means comprising an annular groove around the core and a reduced diameter constriction adjacent the end of the tube and cooperable therewith to provide limited axial movement of the core, passageway means directing fluid axially beyond the tube and core when the core is in the retracted condition and radially of the core when the core is in extended condition, and flow deflector means comprising a surface on said core extending generally transverse to the axis of the tube and facing upwardly for impingement by said fluid, said surface being covered by said tube when the core is retracted and uncovered to direct flow transversely of the tube when the core is extended.

2. An irrigating tool comprising a tube, inlet means at the upper end of said tube for supplying fluid under pressure thereto, valve means at the lower end of said tube, said valve comprising a core reciprocal in the tube and having a pointed end projecting beyond the lower end of the tube, means retaining the core against removal from said tube and providing an extended position and a retracted position, passageway means directing fluid axially beyond the tube and core when the core is in the retracted condition and radially of the core when the core is in extended condition, and flow deflector means comprising a surface on said core extending generally transverse to the axis of the tube and facing upwardly for impingement by said fluid, said surface being covered by said tube when the core is retracted and uncovered to direct flow transversely of the tube when the core is extended, said passageway means comprising an opening extending from the upper end of the core to a point within the tube when the core is retracted and beyond the tube when the core is extended, said passageway means including groove means associated with said core for bypassing fluid around said flow detector means in an axial direction when said core is retracted.

3. An irrigating tool in accordance with claim 1 wherein the surface is covered by the axially facing bottom end surface of the tube.

4. An irrigating tool in accordance with claim 1 wherein the surface is covered by the side wall of the tube.

5. An irrigating tool comprising a tube, inlet means at the upper end of said tube for supplying fluid under pressure thereto, valve means at the lower end of said tube, said valve comprising a core reciprocal in the tube and having a pointed end projecting beyond the lower end of the tube, means retaining the core against removal from said tube and providing an extended position and a retracted position, and passageway means directing fluid axially beyond the tube and core when the core is in the retracted condition and radially of the core when the core is in extended condition, said passageway means comprising an opening extending from the upper end of the core to a point within the tube when the core is retracted and beyond the tube when the core is extended, said passageway means also including cooperating surfaces on the core and tube defining a groove extending axially between the tube and core, said groove communicating with said opening and extending at least to the tube end when the core is retracted.

6. An irrigating tool in accordance with claim 5 wherein means are providing for retaining the core against removal from said tube and providing an extended position and a retracted position, said retaining means comprising an annular groove around the core and a reduced diameter constriction adjacent the end of the tube and cooperable therewith to provide limited axial movement of the core.

7. An irrigating tool in accordance with claim 6 wherein said opening comprises a first portion extending longitudinally of the core and a second portion extending radially of the core, said second portion communicating with said first portion and with said groove.

References Cited
UNITED STATES PATENTS

| | | | |
|---|---|---|---|
| 1,106,679 | 8/1914 | Randall | 239—271 |
| 1,295,166 | 2/1919 | Hoffmann | 239—271 |
| 1,756,582 | 4/1930 | Butler | 239—271 |

DAVID J. WILLIAMOWSKY, *Primary Examiner.*

PETER M. CAUN, *Assistant Examiner.*